United States Patent
Kawakami et al.

(10) Patent No.: US 11,576,302 B2
(45) Date of Patent: Feb. 14, 2023

(54) CHARGING CONTROL SYSTEM, CHARGING STATION, AUTONOMOUS TRAVELING WORKING MACHINE AND CONTROL METHOD FOR CHARGING CONTROL SYSTEM

(71) Applicant: HONDA MOTOR CO., LTD., Tokyo (JP)

(72) Inventors: Toshiaki Kawakami, Wako (JP); Atsushi Sotome, Wako (JP); Toshio Inoue, Wako (JP); Takumi Shiiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 466 days.

(21) Appl. No.: 16/797,254

(22) Filed: Feb. 21, 2020

(65) Prior Publication Data

US 2020/0296887 A1    Sep. 24, 2020

(30) Foreign Application Priority Data

Mar. 22, 2019    (JP) .............................. JP2019-055288

(51) Int. Cl.
  *A01D 34/00*     (2006.01)
  *B60L 53/30*     (2019.01)
  *A01D 34/58*     (2006.01)
  *A01D 101/00*    (2006.01)

(52) U.S. Cl.
  CPC ........... *A01D 34/008* (2013.01); *A01D 34/58* (2013.01); *B60L 53/305* (2019.02); *A01D 2101/00* (2013.01)

(58) Field of Classification Search
  CPC .. A01D 34/008; A01D 34/58; A01D 2101/00; B60L 53/305
  See application file for complete search history.

(56) References Cited

U.S. PATENT DOCUMENTS

2018/0233956 A1 *  8/2018  Moussaoui ............. H02J 50/80

FOREIGN PATENT DOCUMENTS

| GB | 2513912 A | * | 11/2014 | ................ B25J 5/00 |
| JP | 2017-010161 |   | 1/2017 | |
| WO | WO-2012048126 A1 | * | 4/2012 | ............. G05B 13/02 |

OTHER PUBLICATIONS

WO-2017133708-A1, published Aug. 10, 2017 (Year: 2017).*
DE-102011017274-A1, published Oct. 18, 2012 (Year: 2012).*

* cited by examiner

*Primary Examiner* — Calvin Cheung
(74) *Attorney, Agent, or Firm* — Rankin, Hill & Clark LLP

(57) ABSTRACT

A charging control system includes a lawn mower that has a battery and performs a lawn mowing work while traveling autonomously, and a charging station for charging the battery. The lawn mower includes a period calculator for calculating a shutoff period of supply power supplied from the charging station, and a first communication unit. The charging station includes a second communication unit communicating with the first communication unit, an information acquisition unit for acquiring shutoff period information indicating the shutoff period from the first communication unit via the second communication unit, a switch for shutting off the supply power, and a shutoff controller for controlling the operation of the switch. The shutoff controller releases the shutoff of the power supply to the lawn mower based on the shutoff period information.

12 Claims, 8 Drawing Sheets

CHARGING CONTROL SYSTEM, CHARGING STATION, AUTONOMOUS TRAVELING WORKING MACHINE AND CONTROL METHOD FOR CHARGING CONTROL SYSTEM

INCORPORATION BY REFERENCE

The present application claims priority under 35 U.S.C. § 119 to Japanese Patent Application No. 2019-055288 filed on Mar. 22, 2019. The content of the applications is incorporated herein by reference in its entirety.

BACKGROUND OF THE INVENTION

Field of the Invention

The present invention relates to a charging control system, a charging station, an autonomous traveling working machine and a control method for a charging control system.

Description of the Related Art

A lawn mower that autonomously travels in a lawn area and cuts lawn grass is known as one of autonomous traveling working machines that work while autonomously traveling (for example, see Patent Literature 1).

The lawn mower described in Patent Literature 1 is driven by a battery, and the battery is connected to a charging station to be charged.

SUMMARY OF THE INVENTION

However, the lawn mower described in JP 2017-10161A has room for reducing power consumption.

In the lawn mower, for example, even when the battery has been fully charged, the battery is connected to the charging station, which may cause power to be consumed.

The present invention has an object to provide a charging control system, a charging station, an autonomous traveling working machine, and a control method for a charging control system, which are capable of reducing power consumption.

According to an aspect of the present invention, a charging control system includes: an autonomous traveling working machine that includes a battery and performs predetermined work while traveling autonomously; and a charging station for charging the battery, wherein the autonomous traveling working machine includes a period calculator for calculating a shutoff period of supply power supplied from the charging station, and a first communication unit, the charging station includes: a second communication unit communicating with the first communication unit; an information acquisition unit for acquiring period information indicating the shutoff period from the first communication unit via the second communication unit; a shutoff unit for shutting off the supply power; and a shutoff controller for controlling an operation of the shutoff unit, and the shutoff controller releases the shutoff of the supply power based on the period information.

According to another aspect of the present invention, in the above charging control system, the autonomous traveling working machine includes a calculator for calculating the shutoff period based on a current time and a date and time when the predetermined work is started.

According to yet another aspect of the present invention, in the above charging control system, the autonomous traveling working machine includes a charging time calculator for calculating a charging time required to complete charging of the battery based on a residual amount of the battery, and the period calculator calculates the shutoff period based on the charging time and the date and time when the predetermined work starts.

According to yet another aspect of the present invention, in the above charging control system, when the charging of the battery has been completed, the shutoff controller shuts off the supply power.

According to yet another aspect of the present invention, in the above charging control system, when the shutoff period has elapsed, the shutoff controller releases the shutoff of the supply power.

According to yet another aspect of the present invention, in the above charging control system, the autonomous traveling working machine includes a transition unit for causing the autonomous traveling working machine to transition from a normal state to a power saving state when charging of the battery has been completed.

According to yet another aspect of the present invention, in the above charging control system, when the shutoff period has elapsed, the transition unit causes the autonomous traveling working machine to transition from the power saving state to the normal state.

According to yet another aspect of the present invention, in the above charging control system, the autonomous traveling working machine includes an internal power supply circuit for generating operating power for the autonomous traveling working machine based on power stored in the battery, and the transition unit shuts off power supply from the battery to the internal power supply circuit when charging of the battery has been completed.

According to yet another aspect of the present invention, in the above charging control system, the charging control system is configured to be capable of supplying power from the charging station to the internal power supply circuit, and during a period when supply of power from the battery is shut off, when supply of power from the charging station to the internal power supply circuit is started, the internal power supply circuit generates power for operating the transition unit with power supplied from the charging station.

According to yet another aspect of the present invention, a charging station for charging a battery of an autonomous traveling working machine for performing predetermined work while autonomously traveling, includes: an information acquisition unit for acquiring, from the autonomous traveling working machine and by communicating with the autonomous traveling working machine, period information indicating a shutoff period of supply power supplied to the autonomous traveling working machine; a shutoff unit for shutting off the supply power; and a shutoff controller for controlling an operation of the shutoff unit, wherein the shutoff controller releases the shutoff of the supply power based on the period information.

According to yet another aspect of the present invention, an autonomous traveling working machine that includes a battery and performs predetermined work while traveling autonomously, includes: a period calculator for calculating a shutoff period of supply power supplied from the charging station; and a transmitter for transmitting period information defining the shutoff period to the charging station, wherein the charging station receives the period information and releases the shutoff of the supply power based on the period information.

According to yet another aspect of the present invention, a control method of a charging control system including an autonomous traveling working machine that has a battery and performs predetermined work while traveling autonomously, and a charging station for charging the battery, includes: a calculation step for calculating a shutoff period of supply power supplied from the charging station, by the autonomous traveling working machine; a transmission step for transmitting period information indicating the shutoff period to the charging station, by the autonomous traveling working machine; an information acquisition step for receiving the period information to acquire the period information, by the charging station; a shutoff step for shutting off the supply power by the charging station; and a release step for releasing shutoff of the supply power based on the period information by the charging station.

According to these aspects of the present invention, power consumption can be reduced.

DETAILED DESCRIPTION OF THE PREFERRED EMBODIMENTS

Embodiments will be described hereinafter with reference to the drawings.

1. Configuration of Unmanned Lawn Mowing System

[1-1. Overall Configuration of Unmanned Lawn Mowing System]

Figure 1:
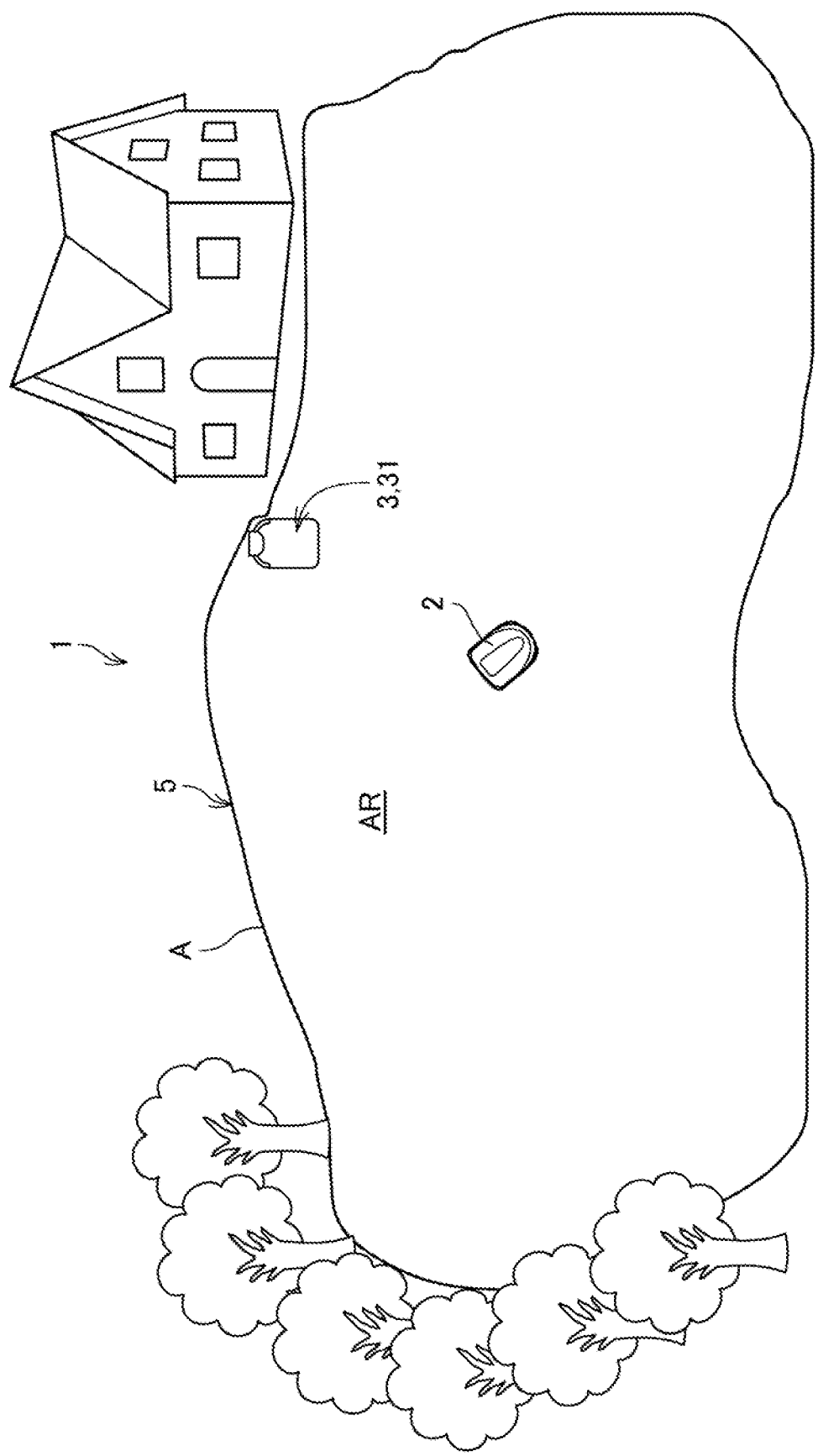
FIG. 1 is a diagram showing an example of a configuration of an unmanned lawn mowing system according to an embodiment of the present invention.

FIG. 1 is a diagram showing a configuration of an unmanned lawn mowing system 1 according to the present embodiment.

An unmanned lawn mowing system 1 includes a robot lawn mower 2, an area wire 5 for defining a lawn mowing area AR that is a target to be subjected to a lawn mowing work, and a charging station 3.

The robot lawn mower 2 is an autonomous traveling type working machine that mows lawn grass while autonomously performs unmanned traveling in the lawn mowing area AR. The area wire 5 is a member to be laid along a boundary A by a trader or the like so as to enable the robot lawn mower 2 to detect the boundary A of the lawn mowing area AR. In the present embodiment, the laid area wire 5 is magnetized, and the robot lawn mower 2 detects the boundary A of the lawn mowing area AR by detecting the magnetism of the area wire 5. The robot lawn mower 2 corresponds to an example of "autonomous traveling working machine".

The charging station 3 includes a control board 31 for charging the robot lawn mower 2, and is installed inside the lawn mowing area AR. The control board 31 will be described in detail with reference to FIG. 4. The charging station 3 is also a standby place for the robot lawn mower 2 under a non-working condition. The robot lawn mower 2 is configured to return to the charging station 3 by autonomous traveling when a lawn mowing work has been finished, and receive charging appropriately at the charging station 3.

[1-2. Configuration of Robot Lawn Mower]

Figure 2:
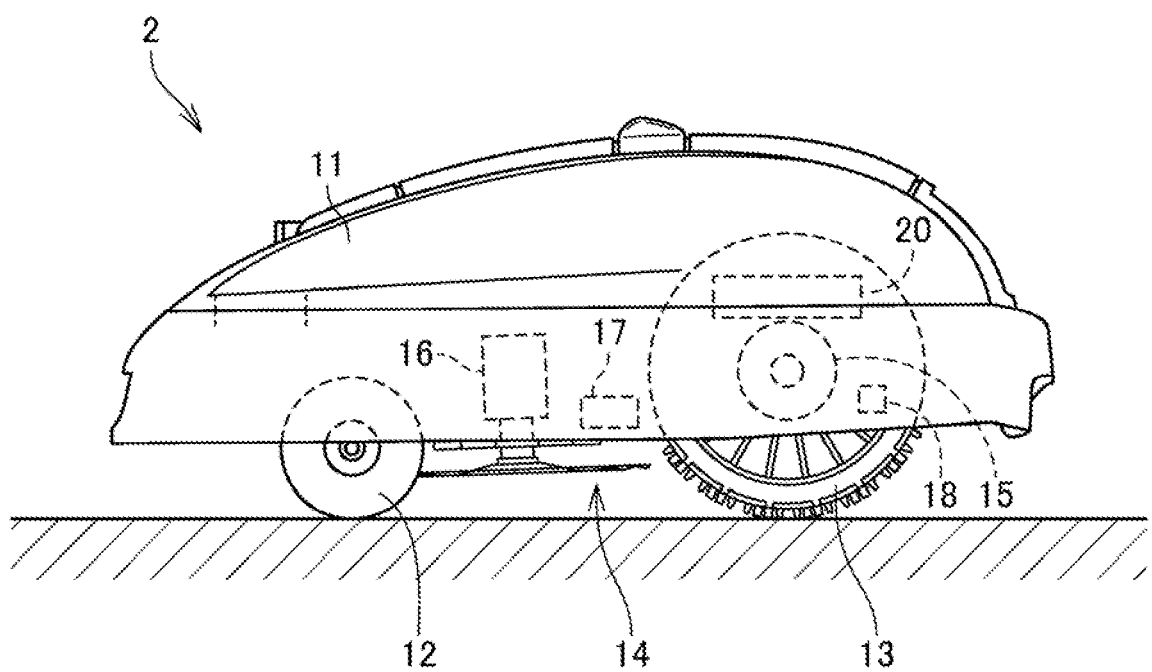
FIG. 2 is a side view showing an example of a configuration of an autonomous traveling working machine.

FIG. 2 is a side view showing an example of a configuration of the robot lawn mower 2 according to the present embodiment.

The robot lawn mower 2 may be referred to as the lawn mower 2 in the following description.

The lawn mower 2 includes a housing 11, right and left front wheels 12 provided at a front portion of the housing 11, right and left rear wheels 13 provided at a rear portion of the housing 11, and a working unit 14 provided at a center lower portion of the housing 11. The working unit 14 is a cutting blade disc provided with a cutting blade, and can cut grass by rotating the cutting blade disc.

The lawn mower 2 includes right and left traveling motors 15, a working unit driving motor 16, a battery 17, a wheel speed sensor 18, and a first controller 20. The housing 11 accommodates the right and left traveling motors 15, the working unit driving motor 16, the battery 17, the wheel speed sensor 18, and the first controller 20.

The respective right and left traveling motors 15 individually drive the right and left rear wheels 13, respectively. The traveling motors 15 drive the rear wheels 13 in accordance with an instruction from the first controller 20, whereby the lawn mower 2 travels. The working unit driving motor 16 drives the working unit 14. The working unit driving motor 16 drives the working unit 14 in accordance with an instruction from the first controller 20, whereby the lawn mowing work is performed. The battery 17 supplies operating power to each unit of the lawn mower 2. The wheel speed sensor 18 detects the rotational speed of the right and left rear wheels 13 serving as driving wheels. A detection signal of the wheel speed sensor 18 is transmitted to the first controller 20.

The first controller 20 controls the operation of each unit of the lawn mower 2. The first controller 20 includes, for example, a processor such as a central processing unit (CPU), and a memory such as a random access memory (RAM) or a read only memory (ROM). Data such as map data related to a working target area, schedule data of a lawn mowing work, and control program are stored in the memory. The first controller 20 will be described in detail with reference to FIGS. 4 and 5.

[1-3. Configuration of Charging Control System]

Figure 3:
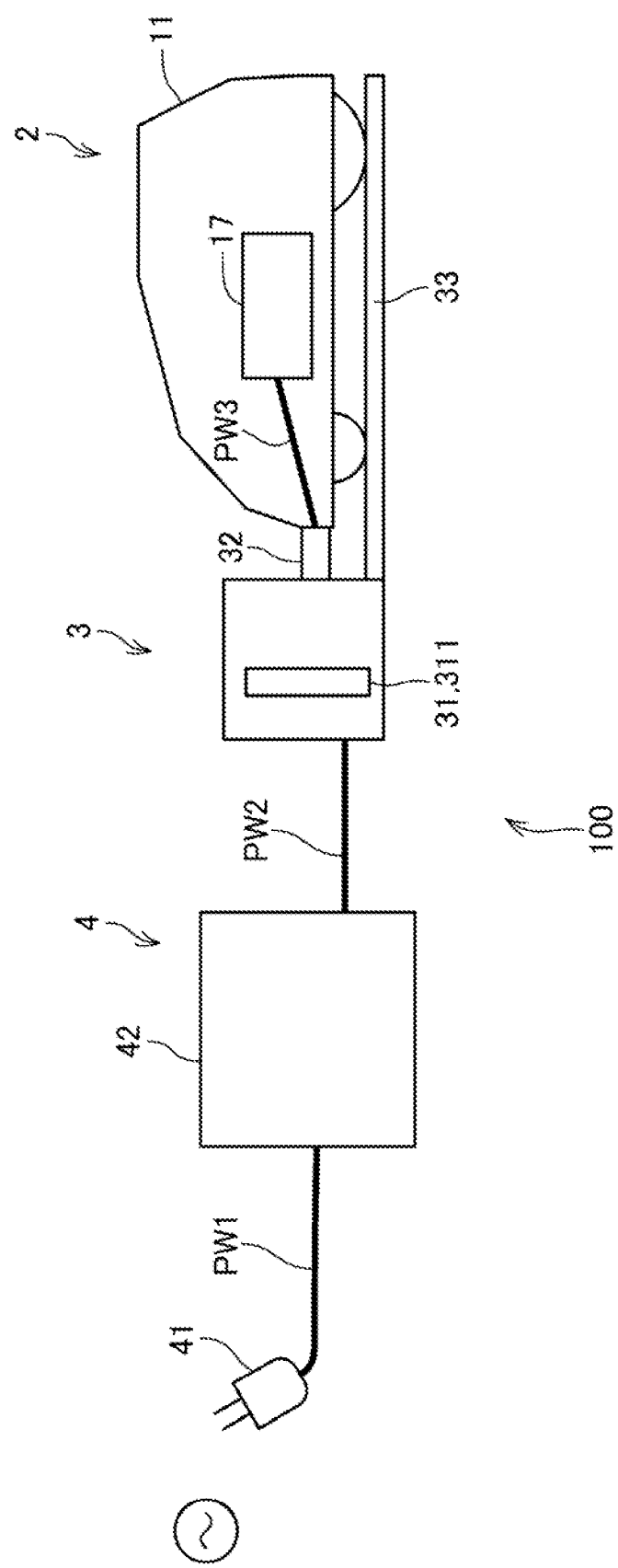
FIG. 3 is a diagram showing an example of a power supply path for a battery.

FIG. 3 is a diagram showing an example of a power supply path of the battery 17 in a charging control system 100.

The charging control system 100 includes a conversion device 4, a charging station 3, and a robot lawn mower 2. The charging control system 100 controls charging of the battery 17 of the robot lawn mower 2.

As shown in FIG. 3, power supplied from a commercial power supply is supplied to the battery 17 via the conversion device 4 and the charging station 3.

The conversion device 4 includes a connection plug 41 and an AC/DC adapter 42. The connection plug 41 is connected to the commercial power supply. The AC/DC adapter 42 converts an AC voltage supplied from the commercial power supply into a DC voltage. The connection plug 41 and the AC/DC adapter 42 are connected to each other by a power wire PW1.

The charging station 3 includes a control board 31, a connection unit 32, and a mount table 33. A second controller 311 is mounted on the control board 31. The second controller 311 controls the operation of the charging station 3. The second controller 311 includes, for example, a processor such as CPU and a memory such as RAM or ROM. Data such as a control program are stored in the memory. The second controller 311 will be described in detail with reference to FIGS. 4 and 5. The conversion device 4 and the charging station 3 are connected to each other by a power wire PW2.

The connection unit 32 connects the charging station 3 and the lawn mower 2 so that energization is possible therebetween. The lawn mower 2 is placed on the mount table 33. The connection unit 32 is configured to connect the charging station 3 and the lawn mower 2 so that energization is possible between the charging station 3 and the lawn mower 2 when the lawn mower 2 is placed on the mount table 33. That is, when the lawn mower 2 is placed on the mount table 33, power can be supplied from the charging station 3 to the lawn mower 2. When the lawn mower 2 is placed on the mount table 33, the connection unit 32 and the battery 17 are connected to each other by a power wire PW3. In other words, when the lawn mower 2 is placed on the mount table 33, power can be supplied from the charging station 3 to the battery 17.

Figure 4:
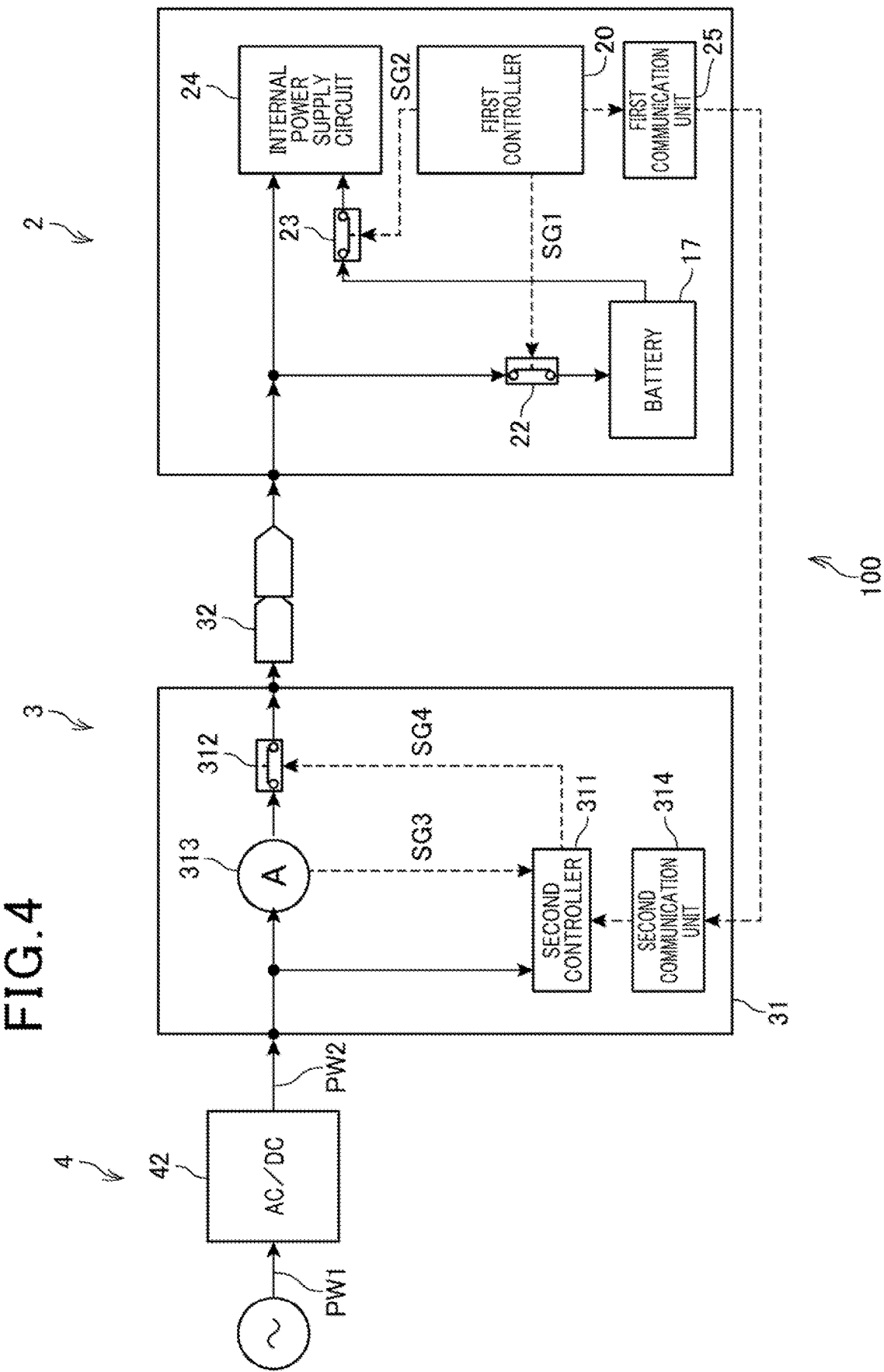
FIG. 4 is a diagram showing an example of a configuration of a charging control system.

FIG. 4 is a diagram showing an example of a configuration of the charging control system 100. In FIG. 4, a path for supplying power is indicated by a solid line, and a path for transmitting a signal and a path for transmitting information are indicated by broken lines.

The second controller 311, a third switch 312, a current detection circuit 313, and a second communication unit 314 (transmitter/receiver) are mounted on the control board 31 of the charging station 3.

A current detection circuit 313 is arranged between the AC/DC adapter 42 and the connection unit 32. The current detection circuit 313 detects a current value of a charging current JB supplied from the AC/DC adapter 42 to the battery 17. A third signal SG3 indicating the current value detected by the current detection circuit 313 is transmitted to the second controller 311.

The third switch 312 is arranged between the current detection circuit 313 and the connection unit 32. The third switch 312 is switched between ON and OFF according to a fourth signal SG4 from the second controller 311. When the third switch 312 is set to ON, power is allowed to be supplied from the charging station 3 to the lawn mower 2. The third switch 312 corresponds to an example of a "shutoff unit".

The second communication unit 314 communicates with a first communication unit 25 (transmitter/receiver) of the lawn mower 2. For example, the second communication unit 314 communicates wirelessly with the first communication unit 25 of the lawn mower 2. Specifically, the second communication unit 314 communicates with the first communication unit 25 by wireless communication such as Bluetooth (registered trademark). Further, the second communication unit 314 may communicate with the first communication unit 25 by wireless communication based on a standard such as a wireless LAN (including Wi-Fi (registered trademark)).

The lawn mower 2 includes the first controller 20, a first switch 22, a second switch 23, an internal power supply circuit 24, and the first communication unit 25.

The first switch 22 is arranged between the connection unit 32 and the battery 17. The first switch 22 is switched between ON and OFF according to a first signal SG1 from the first controller 20. When the third switch 312 is set to ON and the first switch 22 is set to ON, power is allowed to be supplied from the charging station 3 to the battery 17. In other words, the battery 17 can be charged.

The second switch 23 is arranged between the battery 17 and the internal power supply circuit 24. The second switch 23 is switched between ON and OFF in accordance with a second signal SG2 from the first controller 20. When the second switch 23 is set to ON, power is allowed to be supplied from the battery 17 to the internal power supply circuit 24. In this case, electric power can be supplied from the internal power supply circuit 24 to each unit of the lawn mower 2.

The internal power supply circuit 24 is connected to the connection unit 32 and is connected to the battery 17 via the second switch 23. When the second switch 23 is set to ON, power is supplied from the battery 17 to the internal power supply circuit 24 via the second switch 23.

The internal power supply circuit 24 supplies power to each unit of the lawn mower 2. For example, the internal power supply circuit 24 supplies a DC voltage of 3 V to the first controller 20. For example, the internal power supply circuit 24 supplies a DC voltage of 5 V to the first switch 22. In other words, the internal power supply circuit 24 generates DC voltages having a plurality of voltage values from the DC voltage supplied from the battery 17, and supplies each unit of the lawn mower 2 with a DC voltage having a voltage value suitable for the operation of each unit. Further, since the internal power supply circuit 24 is connected to the connection unit 32, power is supplied from the charging station 3 to the internal power supply circuit 24 when the third switch 312 is set to ON. The internal power supply circuit 24 will be further described with reference to FIG. 5.

The first communication unit 25 communicates with the second communication unit 314 of the charging station 3. Specifically, the first communication unit 25 communicates with the second communication unit 314 by wireless communication such as Bluetooth (registered trademark), for example. The first communication unit 25 corresponds to an example of a "transmitter".

[1-4. Configurations of First Controller and Second Controller]

Figure 5:
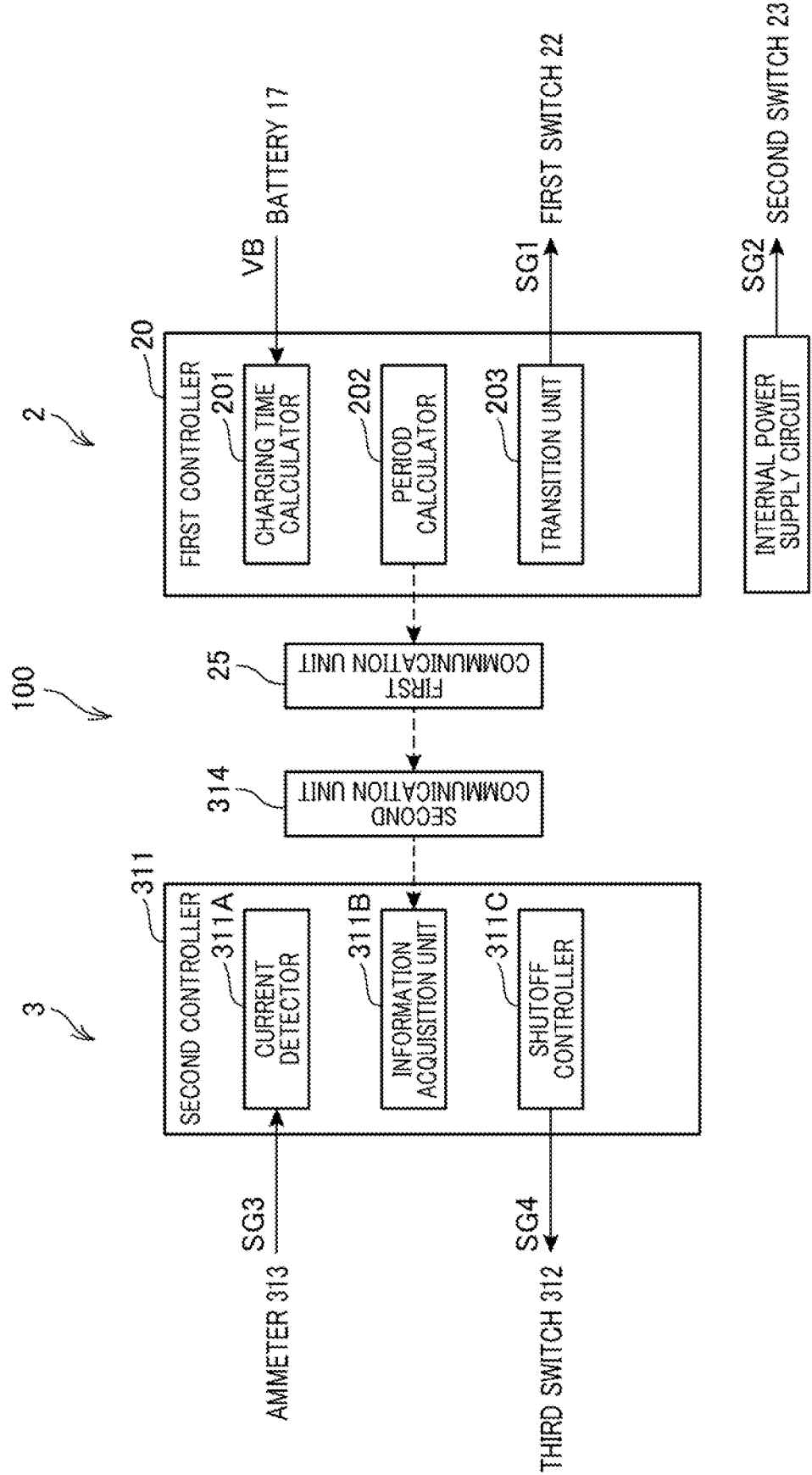
FIG. 5 is a diagram showing an example of a configuration of a first controller and an example of a configuration of a second controller.

FIG. 5 is a diagram showing examples of a configuration of the first controller 20 and a configuration of the second controller 311.

The first controller 20 includes a charging time calculator 201, a period calculator 202, and a transition unit 203. Specifically, the processor of the first controller 20 functions as the charging time calculator 201, the period calculator 202, and the transition unit 203 by executing a control program stored in the memory.

The second controller 311 includes a current detector 311A, an information acquisition unit 311B, and a shutoff controller 311C. Specifically, the processor of the second controller 311 executes a control program stored in the memory, whereby the second controller 311 functions as the current detector 311A, the information acquisition unit 311B, and the shutoff controller 311C.

The charging time calculator 201 calculates a charging time TF required to complete charging of the battery 17 based on a residual amount QR of the battery 17. For example, the charging time calculator 201 detects the battery voltage VB of the battery 17, and calculates the residual amount QR of the battery 17 based on the battery voltage VB. Then, the charging time calculator 201 calculates a charging time TF required to complete charging of the battery 17 based on the residual amount QR of the battery 17.

In the present embodiment, the charging time calculator 201 detects the battery voltage VB and calculates the residual amount QR of the battery 17 based on the battery voltage VB, but the present invention is not limited to this mode. The charging time calculator 201 may calculate the residual amount QR of the battery 17. For example, the charging time calculator 201 may calculate the residual amount QR of the battery 17 based on the charging current JB.

The period calculator 202 calculates a shutoff period PC based on a charging time TF and a date and time when a lawn mowing work is started. The shutoff period PC defines a period during which supply power PS is shutoff. Specifically, the shutoff period PC indicates a period from a charging start time point until the date and time when the lawn mowing work is started. In other words, the shutoff period PC indicates a period from the charging start time point until the time point when the shutoff of the supply power PS is released. The lawn mowing work corresponds to an example of "predetermined work". The date and time when the lawn mowing work is started is stored in the memory of the first controller 20 in advance. The "supply power PS" indicates the power to be supplied from the charging station 3 to the lawn mower 2.

The period calculator 202 transmits shutoff period information DP to the charging station 3. The shutoff period information DP indicates the shutoff period PC. The shutoff period information DP corresponds to an example of "period information".

The transition unit 203 causes the lawn mower 2 to transition from a normal state to a power saving state when the charging of the battery 17 has been completed. In addition, the transition unit 203 causes the lawn mower 2 to transition from the power saving state to the normal state when the shutoff period PC has elapsed.

Note that the "normal state" indicates a state in which the lawn mower 2 can execute the lawn mowing work. For example, the "normal state" indicates a state in which power is supplied from the battery 17 to the internal power supply circuit 24 and power is supplied from the internal power supply circuit 24 to each unit of the lawn mower 2.

The "power saving state" indicates a state in which power to be consumed by the lawn mower 2 is less than that in the "normal state". For example, the "power saving state" indicates a state where no power is supplied from the charging station 3 to the battery 17 and no power is supplied from the battery 17 to the internal power supply circuit 24. In this case, no power is supplied from the internal power supply circuit 24 to each unit of the lawn mower 2. In the present embodiment, the "power saving state" is a so-called shutdown state.

Specifically, when charging of the battery 17 has been completed, the transition unit 203 transmits the first signal SG1 instructing execution of "OFF" to the first switch 22. The first switch 22 is set to OFF according to the instruction based on the first signal SG1 from the transition unit 203. When the first switch 22 is set to OFF, power supply from the charging station 3 to the battery 17 is interrupted.

When the charging of the battery 17 has been completed, the transition unit 203 transmits a second signal SG2 instructing execution of "OFF" to the second switch 23. The second switch 23 is set to OFF according to the instruction based on the second signal SG2 from the transition unit 203. The second switch 23 is set to OFF, whereby power supply from the battery 17 to the internal power supply circuit 24 is interrupted.

When the shutoff period PC has elapsed, the transition unit 203 transmits the second signal SG2 instructing execution of "ON" to the second switch 23. The second switch 23 is set to ON according to the instruction based on the second signal SG2 from the transition unit 203. Since the second switch 23 is set to ON, power is supplied from the battery 17 to the internal power supply circuit 24.

When the shutoff period PC has elapsed, the transition unit 203 transmits the first signal SG1 instructing execution of "ON" to the first switch 22. The first switch 22 is set to ON according to the instruction based on the first signal SG1 from the transition unit 203.

The current detector 311A detects the charging current JB. Specifically, the current detector 311A detects the current value of the charging current JB based on the third signal SG3 from the current detection circuit 313. The third signal SG3 indicates the current value of the charging current JB.

The information acquisition unit 311B acquires the shutoff period information DP from the period calculator 202. Specifically, the information acquisition unit 311B acquires the shutoff period information DP from the period calculator 202 via the first communication unit 25 and the second communication unit 314. The shutoff period information DP indicates the shutoff period PC of the supplied power PS.

The shutoff controller 311C shuts off the supply power PS supplied from the charging station 3 to the lawn mower 2 when the charging of the battery 17 has been completed. Specifically, the shutoff controller 311C determines based on a detection result of current detector 311A whether the charging of the battery 17 has been completed. More specifically, the shutoff controller 311C determines that the charging of the battery 17 has been completed when the current value of the charging current JB is equal to or less than a threshold value.

Further, when it is determined that the charging of the battery 17 has been completed, the shutoff controller 311C transmits a fourth signal SG4 instructing execution of "OFF" to the third switch 312. The third switch 312 is set to OFF according to the instruction based on the fourth signal SG4 from the shutoff controller 311C. Since the third switch 312 is set to OFF, the supply power PS supplied from the charging station 3 to the lawn mower 2 is shut off. As a result, the supply of power from the charging station 3 to the battery 17 and the internal power supply circuit 24 is shut off.

Further, the shutoff controller 311C releases the shutoff of the supply power PS supplied from the charging station 3 to the lawn mower 2 based on the shutoff period information DP acquired by the information acquisition unit 311B. Specifically, the shutoff controller 311C determines whether the shutoff period PC indicated by the shutoff period information DP has elapsed. When it is determined that the shutoff period PC has elapsed, the shutoff controller 311C transmits the fourth signal SG4 instructing execution of "ON" to the third switch 312. The third switch 312 is set to ON according to the instruction based on the fourth signal SG4 from the shutoff controller 311C. Since the third switch 312 is set to ON, the shutoff of the supply power PS supplied from the charging station 3 to the lawn mower 2 is released. In other words, the supply power PS is supplied from the charging station 3 to the lawn mower 2. As a result, power is supplied from the charging station 3 to the internal power supply circuit 24.

When the supply of power from the charging station 3 to the internal power supply circuit 24 is started during the period when the supply of power from the battery 17 is shut off, the internal power supply circuit 24 generates power for causing the transition unit 203 to operate from the power supplied from the charging station 3.

Specifically, when charging of the battery 17 has been completed and the shutoff period PC has elapsed, the internal power supply circuit 24 generates power for causing the first controller 20 to operate from the power supplied from the charging station 3, and supplies the power to the first controller 20.

In other words, when the charging of the battery 17 has been completed, the second switch 23 is set to OFF according to an instruction of the transition unit 203. When the shutoff period PC has elapsed, the third switch 312 is set to ON according to an instruction from the shutoff controller 311C. Therefore, when the charging of the battery 17 has been completed and the shutoff period PC has elapsed, the supply of power from the charging station 3 to the internal power supply circuit 24 is started during the period when the supply of power from the battery 17 is shut off.

In this way, when the supply of power from the charging station 3 to the internal power supply circuit 24 is started, the internal power supply circuit 24 generates power for causing the transition unit 203 to operate from the power supplied from the charging station 3, which makes the transition unit 203 operable. The transition unit 203 causes the lawn mower 2 to transition from the power saving state to the normal state when the shutoff period PC has elapsed. As a result, the lawn mower 2 is allowed to perform a lawn mowing work.

2. Specific Example of Operation of Switch

Figure 6:
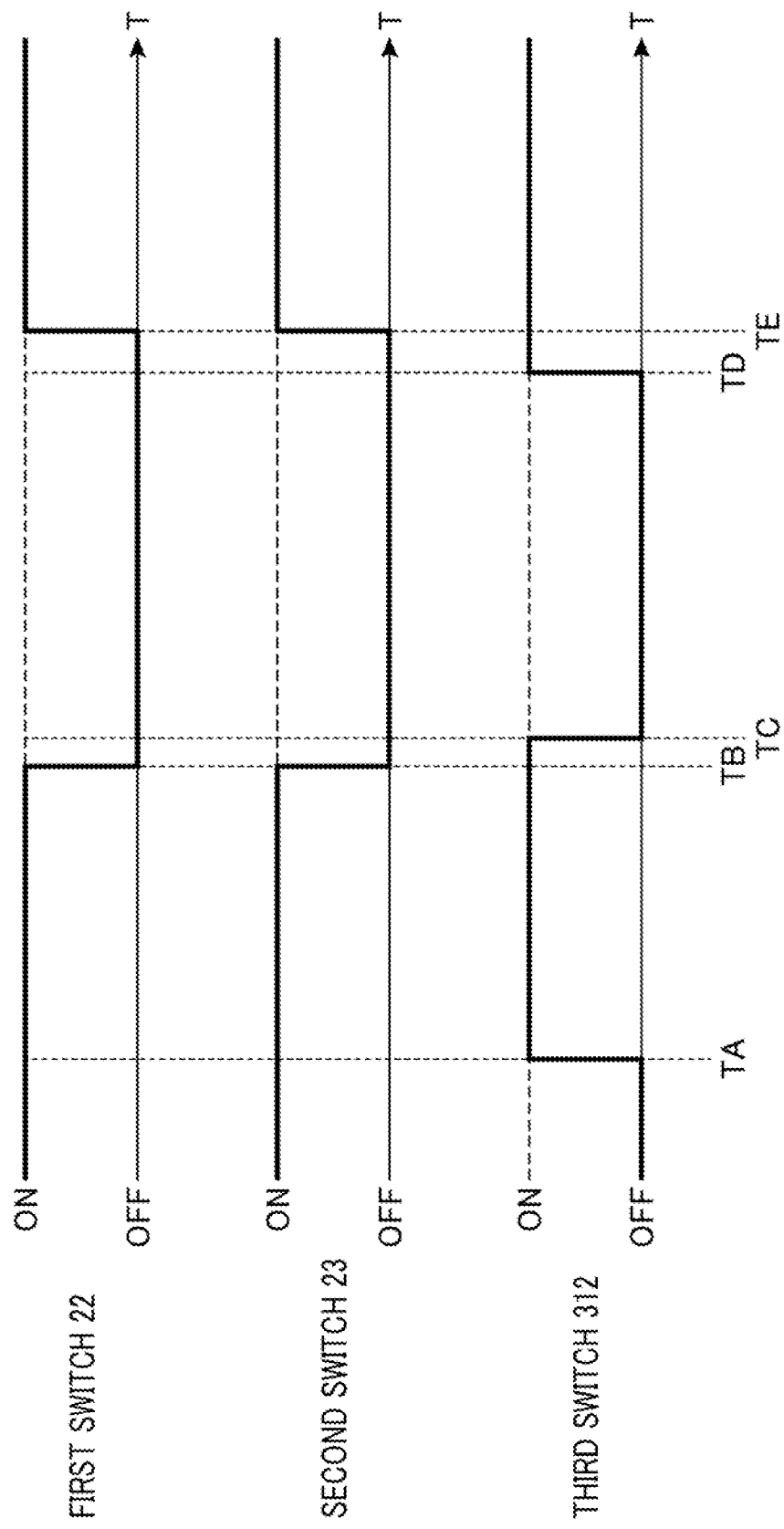
FIG. 6 is a timing chart showing an example of an operation of a switch.

FIG. 6 is a timing chart showing an example of operations of the first switch 22, the second switch 23, and the third switch 312.

In FIG. 6, the timing chart of the first switch 22 is shown at an upper portion, the timing chart of the second switch 23 is shown at a center portion, and the timing chart of the third switch 312 is shown at a lower portion. The horizontal axis of each timing chart represents time T, and the vertical axis represents whether the switch is set to ON or OFF.

First, at a time point TA, the lawn mower 2 is placed on the mount table 33, and the connection unit 32 connects the charging station 3 and the lawn mower 2 so that energization is possible therebetween. When the second controller 311 detects that the charging station 3 and the lawn mower 2 are connected to each other so that energization is possible therebetween, the second controller 311 transmits the fourth signal SG4 instructing execution of "ON" to the third switch 312. The third switch 312 is set to ON according to the instruction based on the fourth signal SG4 from the second controller 311. The third switch 312 is set to ON, whereby charging of the battery 17 is started.

Next, at a time point TB, the transition unit 203 determines that the charging of the battery 17 has been completed, and causes the lawn mower 2 to transition from the normal state to the power saving state.

Specifically, the transition unit 203 transmits the first signal SG1 instructing execution of "OFF" the first switch 22. The first switch 22 is set to OFF according to the instruction based on the first signal SG1 from the transition unit 203. The first switch 22 is set to OFF, whereby supply of power from the charging station 3 to the battery 17 is shut off.

Further, at the time point TB, the transition unit 203 transmits the second signal SG2 instructing execution of "OFF" to the second switch 23. The second switch 23 is set to OFF according to the instruction based on the second signal SG2 from the transition unit 203. The second switch 23 is set to OFF, whereby power supply from the battery 17 to the internal power supply circuit 24 is shut off.

Next, at a time point TC, the shutoff controller 311C determines that the charging of the battery 17 has been completed, and transmits the fourth signal SG4 instructing execution of "OFF" to the third switch 312. The third switch 312 is set to OFF according to the instruction based on the fourth signal SG4 from the shutoff controller 311C. The third switch 312 is set to OFF, whereby supply power PS supplied from the charging station 3 to the lawn mower 2 is shut off.

Next, at a time point TD, the shutoff controller 311C determines that the shutoff period PC has elapsed, and transmits the fourth signal SG4 instructing execution of "ON" to the third switch 312. The third switch 312 is set to ON according to the instruction based on the fourth signal SG4 from the shutoff controller 311C. The third switch 312 is set to ON, whereby the shutoff of the supply power PS supplied from the charging station 3 to the lawn mower 2 is released. In other words, the supply power PS is supplied from the charging station 3 to the lawn mower 2. As a result, power is supplied to the first controller 20 by the internal power supply circuit 24, the first controller 20 is started up, and the transition unit 203 is set to be ready for processing.

Next, at a time point TE, the transition unit 203 determines that the shutoff period PC has elapsed, and transmits the first signal SG1 instructing execution of "ON" to the first switch 22. The first switch 22 is set to ON according to the instruction based on the first signal SG1 from the transition unit 203. The first switch 22 is set to ON, whereby power is supplied from the charging station 3 to the battery 17.

Further, the transition unit 203 transmits the second signal SG2 instructing execution of "ON" to the second switch 23. The second switch 23 is set to ON according to the instruction based on the second signal SG2 from the transition unit 203. The second switch 23 is set to ON, whereby power is supplied from the battery 17 to the internal power supply circuit 24.

[Processing of the First Controller and the Second Controller]

Figure 7:
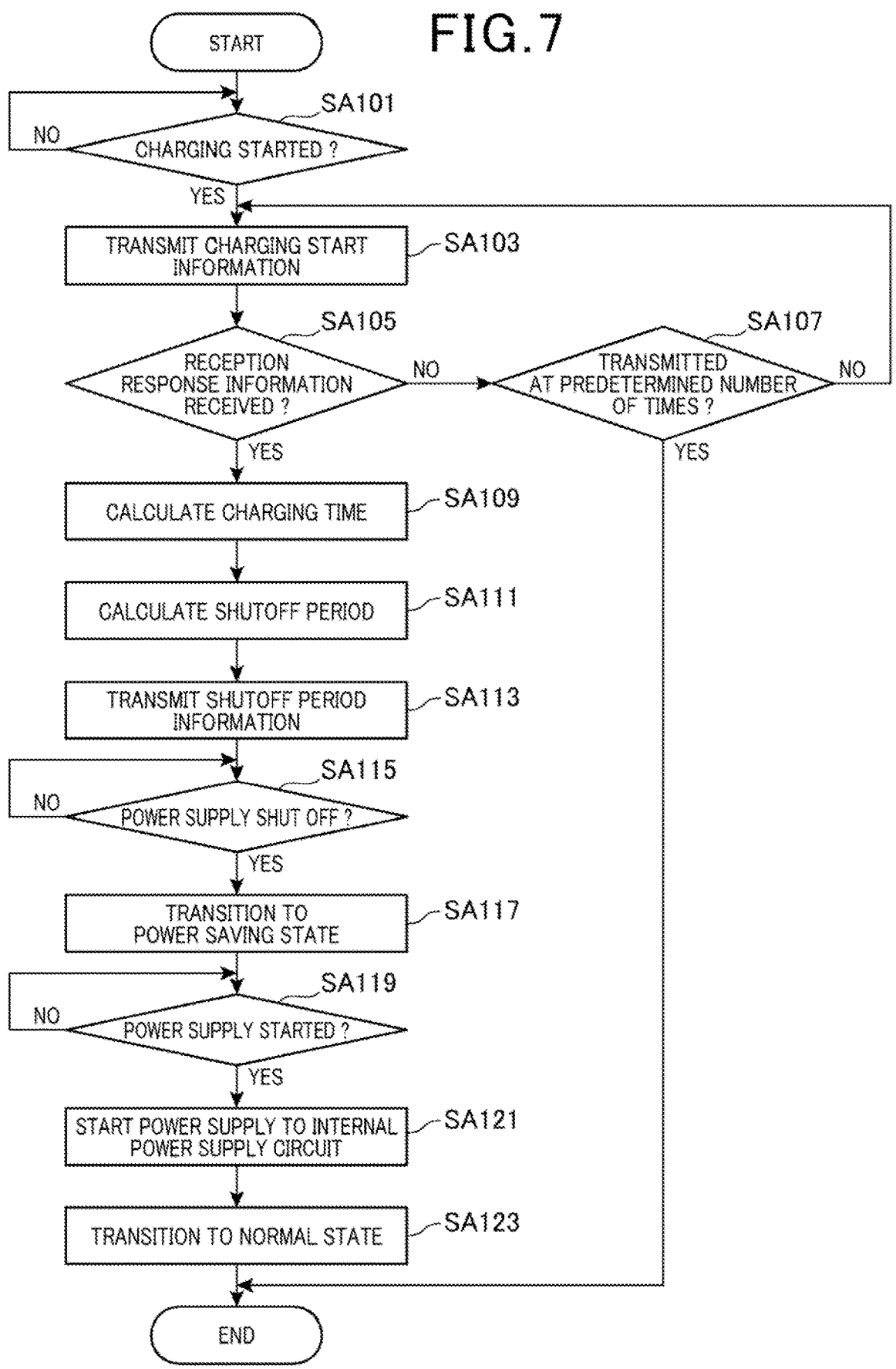
FIG. 7 is a flowchart showing an example of processing of the first controller.

FIG. 7 is a flowchart showing an example of the processing of the first controller 20.

Note that a case where each of the first switch 22, the second switch 23, and the third switch 312 is set to ON in an initial state of FIG. 7 will be described.

As shown in FIG. 7, in step SA101, the first controller 20 first determines whether charging of the battery 17 is started. For example, according to whether a charging current JB is flowing through the first switch 22, the first controller 20 determines whether the charging of the battery 17 is started.

When the first controller 20 determines that the charging of the battery 17 has not started (step SA101: NO), the processing is set to a standby state. When the first controller 20 determines that the charging of the battery 17 has started (step SA101: YES), the processing proceeds to step SA103.

In step SA103, the first controller 20 transmits charging start information DA to the second controller 311. The charging start information DA is information indicating that charging has started.

Next, in step SA105, the first controller 20 determines whether reception response information DB has been detected. The reception response information DB is information indicating that the second controller 311 has received the charging start information DA.

When the first controller 20 determines that the reception response information DB has not been detected (step SA105: NO), the processing proceeds to step SA107.

In step SA107, the first controller 20 determines whether the charging start information DA has been transmitted to the second controller 311 at only a predetermined number of times. The predetermined number of times is, for example, three times.

When the first controller 20 determines that the charging start information DA has been transmitted to the second controller 311 at only the predetermined number of times (step SA107: YES), the processing terminates. When the first controller 20 determines that the charging start information DA has not been transmitted to the second controller 311 at only the predetermined number of times (step SA107: NO), the processing returns to step SA103.

When the first controller 20 determines that the reception response information DB has been detected (step SA105: YES), the processing proceeds to step SA109.

In step SA109, the charging time calculator 201 calculates the charging time TF required to complete the charging of the battery 17 based on the residual amount QR of the battery 17.

Next, in step SA111, the period calculator 202 calculates the shutoff period PC based on the charging time TF and the date and time when a lawn mowing work is started. The shutoff period PC indicates a period from a time point when charging is started until a time point when the shutoff of the supply power PS is released.

Next, in step SA113, the period calculator 202 transmits the shutoff period information DP to the second controller 311. The shutoff period information DP is information indicating the shutoff period PC.

Next, in step SA115, the transition unit 203 determines whether charging of the battery 17 has been completed and the supply power PS has been shut off. For example, the transition unit 203 determines based on the charging current JB whether the supply power PS has been shut off. Specifically, when the charging current JB is zero, the transition unit 203 determines that the supply power PS has been shut off.

When the transition unit 203 determines that the supply power PS is not shut off (step SA115: NO), the processing is set to a standby state. When the transition unit 203 determines that the supply power PS has been shut off (step SA115: YES), the processing proceeds to step SA117.

In step SA117, the transition unit 203 causes the lawn mower 2 to transition from the normal state to the power saving state. Specifically, the transition unit 203 sets the first switch 22 to OFF, and sets the second switch 23 to OFF.

Next, in step SA119, the internal power supply circuit 24 determines whether supply of power from the charging station 3 to the internal power supply circuit 24 is started. When the internal power supply circuit 24 determines that the supply of power from the charging station 3 to the internal power supply circuit 24 has not been started (step SA119: NO), the processing is set to a standby state. When the internal power supply circuit 24 determines that the supply of power from the charging station 3 to the internal power supply circuit 24 is started (step SA119: YES), the processing proceeds to step SA121.

In step SA121, the internal power supply circuit 24 generates power for causing the first controller 20 to operate from power supplied from the charging station 3, and supplies the power to the first controller 20. The transition unit 203 starts to supply power from the battery 17 to the internal power supply circuit 24. Specifically, the transition unit 203 starts the supply of power from the battery 17 to the internal power supply circuit 24 by setting the second switch 23 to ON.

Next, in step SA123, the transition unit 203 causes the lawn mower 2 to transition from the power saving state to the normal state, and the processing terminates. Specifically, the transition unit 203 sets the first switch 22 to ON.

Figure 8:
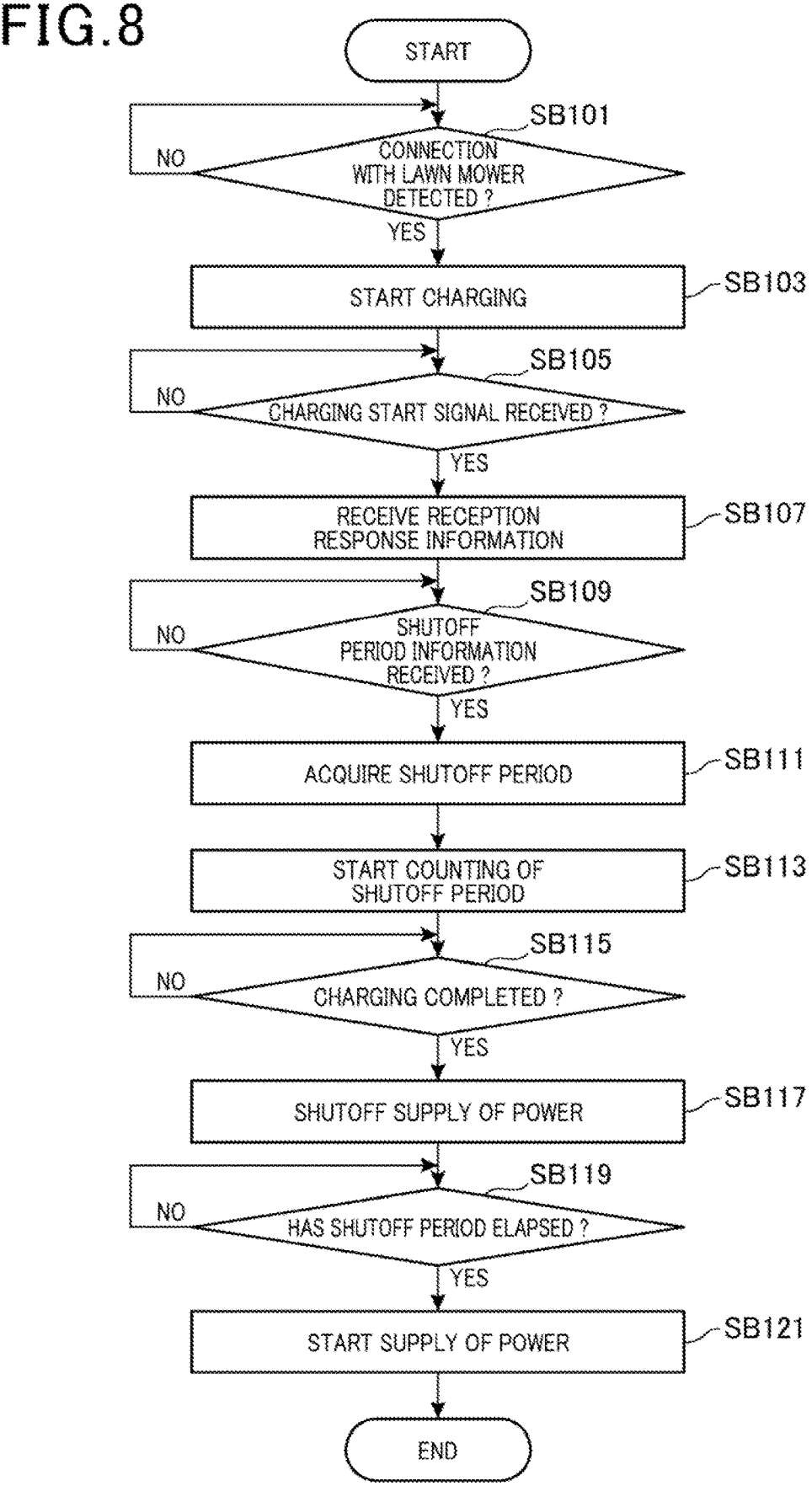
FIG. 8 is a flowchart showing an example of processing of the second controller.

FIG. 8 is a flowchart showing an example of processing of the second controller 311.

Note that a case where each of the first switch 22, the second switch 23, and the third switch 312 is set to ON in an initial state of FIG. 8 will be described.

In step SB101, the second controller 311 first determines whether a connection with the lawn mower 2 has been detected. For example, by detecting electrical conduction at the connection unit 32, the second controller 311 determines whether the connection with the lawn mower 2 has been detected.

When the second controller 311 determines that the connection with the lawn mower 2 has not been detected (step SB101: NO), the processing is set to a standby state. When the second controller 311 determines that the connection with the lawn mower 2 has been detected (step SB101: YES), the processing proceeds to step SB103.

Next, in step SB103, the second controller 311 starts charging of the battery 17.

Next, in step SB105, the second controller 311 determines whether the charging start information DA has been received. The charging start information DA indicates that the first controller 20 starts to transmit the shutoff period information DP to the second controller 311.

When the second controller 311 determines that the charging start information DA has not been received (step SB105: NO), the processing is set to a standby state. When the second controller 311 determines that the charging start information DA has been received (step SB105: NO), the processing proceeds to step SB107.

In step SB107, the second controller 311 transmits the reception response information DB to the first controller 20. The reception response information DB indicates that the charging start information DA has been received.

Next, in step SB109, the information acquisition unit 311B determines whether the shutoff period information DP has been received.

When the information acquisition unit 311B determines that the shutoff period information DP has not been received (step SB109: NO), the processing is set to a standby state. When the information acquisition unit 311B determines that the shutoff period information DP has been received (step SB109: YES), the processing proceeds to step SB111.

In step SB111, the information acquisition unit 311B acquires the shutoff period information DP. The shutoff period information DP indicates the shutoff period PC of the supply power PS. The shutoff period PC indicates a period from a time point when charging is started until a time point when the shutoff of the supply power PS is released.

Next, in step SB113, the shutoff controller 311C starts counting of the shutoff period PC.

Next, in step SB115, the shutoff controller 311C determines whether the charging of the battery 17 has been completed.

When the shutoff controller 311C determines that the charging of the battery 17 has not been completed (step SB115: NO), the processing is set to a standby state. When the shutoff controller 311C determines that the charging of the battery 17 has been completed (step SB115: YES), the processing proceeds to step SB117.

In step SB117, the shutoff controller 311C shuts off the supply power PS. In other words, the shutoff controller 311C shuts off the supply of power from the charging station 3 to the battery 17 and the internal power supply circuit 24.

Next, in step SB119, the shutoff controller 311C determines whether the shutoff period PC has elapsed.

When the shutoff controller 311C determines that the shutoff period PC has not elapsed (step SB119: NO), the processing is set to a standby state. When the shutoff controller 311C determines that the shutoff period PC has elapsed (step SB119: YES), the processing proceeds to step SB121.

In step SB121, the shutoff controller 311C releases the shutoff of the supply power PS. In other words, the shutoff controller 311C starts to supply power from the charging station 3 to the battery 17 and the internal power supply circuit 24. Thereafter, the processing terminates.

Step SA111 in FIG. 7 corresponds to an example of "calculation step". Step SA113 in FIG. 7 corresponds to an example of "transmission step". Step SB111 in FIG. 8 corresponds to an example of "information acquisition step". Step SB117 in FIG. 8 corresponds to an example of "shutoff step". Steps SB119 and SB121 in FIG. 8 correspond to an example of "release step".

4. Effect of Embodiment

As described above, in the present embodiment, the charging control system 100 includes the battery 17, and also includes the lawn mower 2 that performs a lawn mowing work while autonomously traveling, and the charging station 3 for charging the battery 17. The lawn mower 2 includes the period calculator 202 for calculating the shutoff period PC of the supply power PS supplied from the charging station 3, and the first communication unit 25. The charging station 3 includes the second communication unit 314 that communicates with the first communication unit 25, the information acquisition unit 311B for acquiring the shutoff period information DP indicating the shutoff period PC from the period calculator 202 via the first communication unit 25, and the shutoff controller 311C for shutting off the supply power PS. The shutoff controller 311C releases the shutoff of the power supply to the lawn mower 2 based on the shutoff period information DP.

In other words, the information acquisition unit 311B acquires the shutoff period information DP from the period calculator 202 by communication. Further, the shutoff controller 311C shuts off the supply power PS and releases the shutoff of the supply power PS based on the shutoff period information DP.

Accordingly, the power consumption of the lawn mower 2 can be reduced. For example, when charging has been completed, the shutoff controller 311C shuts off the supply power PS, and when the shutoff period PC has elapsed, the shutoff controller 311C releases the shutoff of the supply power PS. In this case, the power consumption of the lawn mower 2 can be effectively reduced.

Moreover, a control method for the charging station 3, the lawn mower 2, and the charging control system 100 according to the present embodiment can obtain the same effect as described above.

Further, the lawn mower 2 includes the charging time calculator 201 for calculating the charging time TF required to complete the charging of the battery 17 based on the residual amount of the battery 17, and the period calculator 202 calculates the shutoff period PC based on the charging time TF and the date and time when the lawn mowing work is started.

Therefore, an appropriate shutoff period PC can be calculated. Accordingly, the power consumption of the lawn mower 2 can be effectively reduced.

Further, when charging of the battery 17 has been completed, the shutoff controller 311C shuts off the supply power PS.

Accordingly, power consumption can be effectively reduced.

Further, when the shutoff period PC has elapsed, the shutoff controller 311C releases the shutoff of the supply power PS.

Therefore, it can be notified to the lawn mower 2 with a simple configuration that the shutoff period PC has elapsed. Therefore, the lawn mower 2 can be started up at an appropriate timing.

Further, the lawn mower 2 includes the transition unit 203 for causing the lawn mower 2 to transition from the normal state to the power saving state when the charging of the battery 17 has been completed.

Therefore, when the charging of the battery 17 has been completed, the lawn mower 2 is transitioned from the normal state to the power saving state. Therefore, the power consumption of the lawn mower 2 can be reduced.

Moreover, when the shutoff period PC has elapsed, the transition unit 203 causes the lawn mower 2 to transition from the power saving state to the normal state.

Accordingly, the lawn mower 2 is kept in a power saving state until the shutoff period PC has elapsed. Therefore, the power consumption of the lawn mower 2 can be reduced. Moreover, since the lawn mower 2 is transitioned from the power saving state to the normal state when the shutoff period PC has elapsed, the lawn mower 2 can be transitioned to a state in which it can operate at an appropriate timing.

The lawn mower 2 also includes the internal power supply circuit 24 for generating operating power for the lawn mower 2 based on stored power of the battery 17. The transition unit 203 shuts off the supply of power from the battery 17 to the internal power supply circuit 24 when the charging of the battery 17 has been completed.

Therefore, when the charging of the battery 17 has been completed, the power supply from the battery 17 to the internal power supply circuit 24 for generating the operating power of the lawn mower 2 is shut off, so that the consumption amount of power stored in the battery 17 can be reduced. Therefore, the power consumption of the lawn mower 2 can be reduced.

Further, the charging control system 100 is configured so that power can be supplied from the charging station 3 to the internal power supply circuit 24. When the supply of power from the charging station 3 to the internal power supply circuit 24 is started during the period when the supply of power from the battery 17 is shut off, the internal power supply circuit 24 generates power for causing the transition unit 203 to operate from the power supplied from the charging station 3.

Therefore, even during the period when the supply of power from the battery 17 to the internal power supply circuit 24 is shut off, the transition unit 203 can be caused to operate by the power supplied from the charging station 3. Accordingly, the transition unit 203 can be operated even during the period when power supply from the battery 17 to the internal power supply circuit 24 is shut off. As a result, it is possible to reduce the power consumption of the lawn mower 2 during the period when the power supply from the battery 17 to the internal power supply circuit 24 is shut off.

5. Other Embodiments

The present invention is not limited to the configuration of the embodiment described above, and may be implemented in various modes without departing from the subject matter of the invention.

For example, in the present embodiment, the "autonomous traveling working machine" is the robot lawn mower 2, but the present invention is not limited to this mode. The "autonomous traveling working machine" may perform predetermined work while traveling autonomously. For example, the "autonomous traveling working machine" may be a security robot that performs a monitoring work while autonomously traveling.

In the present embodiment, the "power saving state" is a so-called shutdown state, but the present invention is not limited to this mode. The "power saving state" may be a so-called sleep state. In this case, the configuration of the lawn mower 2 can be simplified. Specifically, the second switch 23 of the lawn mower 2 is unnecessary. Even in a state where the supply power PS is shut off, power is supplied from the battery 17 to the internal power supply circuit 24, so that the lawn mower 2 can be easily transitioned to the "normal state". As a result, the processing of the first controller 20 can be simplified.

In the present embodiment, the shutoff controller 311C shuts off the power supply to the lawn mower 2 from the time when charging of the battery 17 has been completed until the time when the shutoff period PC has elapsed, but the present invention is not limited to this mode.

The shutoff of power supply to the lawn mower 2 may be released based on the shutoff period PC.

For example, the power supply to the lawn mower 2 may be shut off after the amount of power stored in the battery 17 has reached a predetermined amount. The predetermined amount is set to, for example, 80% of the amount of stored power when fully charged. In this case, it is possible to effectively reduce the consumption of power supplied from the charging station 3 to the lawn mower 2. In this case, the charging time calculator 201 does not have to calculate the charging time TF. In this case, the period calculator 202 calculates the shutoff period PC based on the date and time when a lawn mowing work is started.

For example, "the date and time when the lawn mowing work is started" is stored in a memory of the first controller 20 of the lawn mower 2 by inputting of the user. For example, a working time zone for starting the lawn mowing work is stored for each day of the week in the memory. The working time zone may exist several times a day. The period calculator 202 may calculate, as the "shutoff period PC", the time from a "current time" to a "working time zone that will come next among a plurality of working time zones" stored in the memory.

Further, for example, the power supply to the lawn mower 2 may be shut off until a predetermined time before the shutoff period PC has elapsed. The predetermined time is, for example, the time required for starting the lawn mower 2. In this case, the lawn mower 2 can be operated immediately when the shutoff period PC has elapsed.

In the present embodiment, the charging station 3 and the lawn mower 2 communicate with each other wirelessly, but the present invention is not limited to this mode. The charging station 3 and the lawn mower 2 may communicate with each other. For example, the charging station 3 and the lawn mower 2 may communicate with each other in a wired communication mode. Specifically, a communication line for connecting the second controller 311 and the first controller 20 via the connection unit 32 may be arranged, whereby the second controller 311 and the first controller 20 communicate with each other so that the second controller 311 and the first controller 20 can communicate with each other via the communication line. Furthermore, for example, the second controller 311 and the first controller 20 may perform so-called power line communication via a power line.

At least a part of the functional blocks shown in FIGS. 2 to 4 and the like may be configured to be implemented by hardware or to be implemented by cooperation of hardware and software. The present invention is not limited to a configuration in which independent hardware resources are arranged as shown in the figures.

The control program executed by each of the first controller 20 and the second controller 311 may be stored in another storage unit in the memory. Moreover, each of the first controller 20 and the second controller 311 may be configured to acquire a control program stored in an external device via the communication unit or the like and execute the control program.

The timing chart shown in FIG. 6 is merely an example, and the present invention is not limited to this example. For example, in FIG. 6, the first switch 23 is set to OFF, the second switch 24 is set to OFF, and the third switch 312 is set to OFF at the time point TB to the time point TC, but the present invention is not limited to this mode. The first switch 23 may be set to OFF, the third switch 312 may be set to OFF, and the second switch 24 may be set to OFF.

The processing units of the flowcharts shown in FIGS. 7 and 8 are obtained by dividing the processing of each of the first controller 20 and the second controller 311 according to main processing contents in order to facilitate understanding of the processing of each of the first controller 20 and the second controller 311. The embodiments are not limited by a dividing manner and names of the processing units shown in the flowcharts shown in FIGS. 7 and 8. Further, the processing of the first controller 20 and the second controller 311 may be divided into more processing units according to the processing contents, or may be divided so that one processing unit includes more processing pieces. Further, the processing orders of the above-described flowcharts are not limited to the examples shown in the figures.

Further, when the charging time calculator 201 does not calculate the charging time TF, the step SA109 in FIG. 7 and the step SB105 in FIG. 8 are unnecessary. Further, in FIG. 7, the processing of step SA103 to step SA107 may be executed after step SA113. The processing of step SB105 in FIG. 8 may be executed after step SB109.

DESCRIPTION OF REFERENCE SIGNS

100 charging control system
2 robot lawn mower, lawn mower (autonomous traveling working machine)
17 battery
20 first controller
201 charging time calculator
202 period calculator
203 transition unit
22 first switch 23 second switch
24 internal power supply circuit
25 first communication unit (transmitter)
3 charging station
31 control board
311 second controller
311A current detector
311B information acquisition unit
311C shutoff controller
312 third switch (shutoff unit)
314 second communication unit
32 connection unit
4 conversion device
42 AC/DC adapter
DA charging start information
DB reception response information
DP shutoff period information (period information)
JB charging current
PC shutoff period
PS supply power
TF charging time
VB battery voltage

What is claimed is:

1. A charging control system comprising:
an autonomous traveling working machine that includes a battery and performs predetermined work while traveling autonomously; and
a charging station for charging the battery,
wherein the autonomous traveling working machine comprises a period calculator for calculating a shutoff period of supply power supplied from the charging station, and a first communication unit,
the charging station comprises:
a second communication unit communicating with the first communication unit;
a first processor for acquiring period information indicating the shutoff period from the first communication unit via the second communication unit; and
a switch for shutting off the supply power, wherein the first processor is configured for controlling an operation of the switch, and
the first processor releases the shutoff of the supply power based on the period information.

2. The charging control system according to claim 1, wherein the autonomous traveling working machine comprises a calculator for calculating the shutoff period based on a current time and a date and time when the predetermined work is started.

3. The charging control system according to claim 1, wherein the autonomous traveling working machine comprises a charging time calculator for calculating a charging time required to complete charging of the battery based on a residual amount of the battery, and the period calculator calculates the shutoff period based on the charging time and the date and time when the predetermined work starts.

4. The charging control system according to claim 1, wherein when the charging of the battery has been completed, the first processor shuts off the supply power.

5. The charging control system according to claim 1, wherein when the shutoff period has elapsed, the first processor releases the shutoff of the supply power.

6. The charging control system according to claim 1, wherein the autonomous traveling working machine comprises a second processor for causing the autonomous traveling working machine to transition from a normal state to a power saving state when the charging of the battery has been completed.

7. The charging control system according to claim 6, wherein when the shutoff period has elapsed, the second processor causes the autonomous traveling working machine to transition from the power saving state to the normal state.

8. The charging control system according to claim 6, wherein the autonomous traveling working machine comprises an internal power supply circuit for generating operating power for the autonomous traveling working machine based on power stored in the battery, and the second processor shuts off power supply from the battery to the internal power supply circuit when the charging of the battery has been completed.

9. The charging control system according to claim 8, wherein the charging control system is configured to be capable of supplying power from the charging station to the internal power supply circuit, and during a period when the supply of power from the battery is shut off, when supply of power from the charging station to the internal power supply circuit is started, the internal power supply circuit generates power for operating the second processor with the power supplied from the charging station.

10. A charging station for charging a battery of an autonomous traveling working machine for performing predetermined work while autonomously traveling, the charging station comprising:
a processor for acquiring, from the autonomous traveling working machine and by communicating with the autonomous traveling working machine, period information indicating a shutoff period of supply power supplied to the autonomous traveling working machine; and
a switch for shutting off the supply power, wherein the processor is configured for controller an operation of the switch, wherein the processor releases the shutoff of the supply power based on the period information.

11. An autonomous traveling working machine that includes a battery and performs predetermined work while traveling autonomously, the autonomous traveling working machine comprising:
a period calculator for calculating a shutoff period of supply power supplied from a charging station; and
a transmitter for transmitting period information defining the shutoff period to the charging station, wherein the charging station receives the period information and releases the shutoff of the supply power based on the period information.

12. A control method of a charging control system including an autonomous traveling working machine that has a battery and performs predetermined work while traveling autonomously, and a charging station for charging the battery, the control method comprising:
calculating a shutoff period of supply power supplied from the charging station, by the autonomous traveling working machine;
transmitting period information indicating the shutoff period to the charging station, by the autonomous traveling working machine,
receiving the period information to acquire the period information, by the charging station;
shutting off the supply power by the charging station; and
releasing the shutoff of the supply power based on the period information by the charging station.

* * * * *